USO05463504A

United States Patent [19]
Kimura et al.

[11] Patent Number: 5,463,504
[45] Date of Patent: Oct. 31, 1995

[54] MAGNETIC DISK SYSTEM AND WAVEFORM EQUALIZER THEREFOR

[75] Inventors: Hiroshi Kimura; Shoichi Miyazawa; Ryutaro Horita; Kenichi Hase, all of Yokohama; Akihiko Hirano, Fujisawa; Akira Uragami, Sawa, all of Japan

[73] Assignee: Hitachi, Ltd., Tokyo, Japan

[21] Appl. No.: 62,770

[22] Filed: May 18, 1993

[30] Foreign Application Priority Data

May 18, 1992 [JP] Japan ..................... 4-124456

[51] Int. Cl.$^6$ ..................................................... G11B 5/09
[52] U.S. Cl. ................................. 360/65; 360/46
[58] Field of Search ......................... 360/65, 51, 46; 375/14, 11, 99, 101; 333/28 R

[56] References Cited

U.S. PATENT DOCUMENTS 4,945,311  7/1990  Smith ........................................ 328/167

FOREIGN PATENT DOCUMENTS

| 62-102481 | 5/1987 | Japan . |
| 63-122061 | 5/1988 | Japan . |
| 64-180116 | 3/1989 | Japan . |
| 64-180117 | 3/1989 | Japan . |

OTHER PUBLICATIONS

Couch, "Digital and Analog Communication Systems", Jan. 1989, pp. 269–277.

Primary Examiner—Donald Hajec
Assistant Examiner—Thien Minh Le
Attorney, Agent, or Firm—Antonelli, Terry, Stout & Kraus

[57] ABSTRACT

A magnetic disk system which records and reproduces data on a magnetic disk at different data transfer rates depending on a track position on the disk includes a transversal waveform equalizing circuit which implements an optimal waveform shaping for a readout waveform. The waveform equalizing circuit consists of a register, a frequency synthesizer, a PLL, and a transversal circuit. The transversal circuit consists of variable delay circuits, variable gain amplifiers, and an adder. The frequency synthesizer produces a write clock signal having a frequency which corresponds to a value stored in the register which depends on the data transfer rate, and the PLL responds to the write clock signal to produce a control signal by which the delay time of the transversal circuit is controlled. Consequently, the delay characteristic is not affected by disparity of circuit components of the transversal circuit, and the write clock frequency and the delay time of the transversal circuit can be set to intended values by merely changing the value stored in the register in response to a variation of the data transfer rate.

13 Claims, 11 Drawing Sheets

MAGNETIC DISK SYSTEM AND WAVEFORM EQUALIZER THEREFOR

BACKGROUND OF THE INVENTION

The present invention relates to a magnetic disk system, and particularly to a waveform equalizer therefor which includes a transversal circuit or programmable filter for implementing an optimal waveform shaping process for arbitrary data transfer rates on a read channel, thereby improving a reproduction margin.

A method of increasing the storage capacity of a magnetic disk is to increase the recording bit density. However, the conventional magnetic disk system is designed to read and write data at the same data transfer rate regardless of the track position on the disk which turns at a constant rotational speed, and therefore the recording bit density is smaller the further out as the track position is and this recording scheme is disadvantageous for the disk to have an increased storage capacity although it has a better margin of recording performance. With the intention of overcoming this problem, there has been a new recording scheme called "CDR" (Constant Density Recording). This recording scheme is designed to vary the data transfer rate depending on the track position on the disk so that outer tracks have a bit density as high as inner tracks, thereby increasing the recording capacity of the magnetic disk. Accordingly, in the CDR system, data read out of the disk has different frequency components depending on a track position, and therefore it is necessary for a waveform shaping circuit which processes the readout signal to vary its characteristics depending on the data transfer rate. When a transversal circuit is used, there arises the necessity of a waveform equalizing circuit which implements the optimal waveform equalization by varying the delay time depending on the data transfer rate. Another necessity is a programmable filter having its cutoff frequency set arbitrarily.

A cosine equalizing circuit, which is a conventional waveform equalizing circuit based on variable delay circuits, will be explained with reference to FIG. 1. The circuit consists of registers 101 and 1401, an external control signal generating circuit 1402, a frequency synthesizer 102, and a transversal circuit 104. The transversal circuit 104 consists of variable delay circuits 111–114, amplifiers 105–109, and an adder 115.

In the magnetic disk system, the register 101 stores a value determined from the data transfer rate, and the frequency synthesizer 102 produces a write clock signal 110 having a frequency which depends on the value in the register 101. For setting the delay time of the transversal circuit 104 by the register 1401, the external control signal generating circuit 1402 produces a control signal in correspondence to the value stored in the register 1401, and the control signal controls the delay time of the transversal circuit 104.

FIGS. 2a–2c shows the principle of the above-mentioned operation. The delay circuits and amplifiers produce output signals as shown by, 2302 and 2303 from an input signal 2301 depending on each delay time and amplification. These output signals are summed by the adder 115, resulting in an equalized signal shown by 2304.

A conventional programmable filter will be explained with reference to FIG. 3 and FIG. 4. FIG. 3 is a brief block diagram of a conventional programmable filter, and it consists of a register B 2101, a register A 101, a DAC (D/A converter) 2103, a programmable filter 1601, and a frequency synthesizer 102. In the magnetic disk system, the register A 101 stores a value determined from the data transfer rate, and frequency synthesizer 102 produces a write clock signal 110 with a frequency which depends on the value stored in the register A 101.

For setting the cutoff frequency of the programmable filter 1601 by the register B 2101, the D/A converter 2103 produces a control signal 1602 which corresponds to the value stored in the register B 2101, and the control signal 1602 controls the cutoff frequency of the filter.

FIG. 4 shows another conventional programmable filter which is derived from the one shown in FIG. 3 by adding a reference oscillator 2201. The D/A converter 2103 produces a control signal 1602 in response to the value stored in the register B 2101 and to the output signal of the reference oscillator 2201, and the control signal controls the cutoff frequency of the filter 1601 thereby to compensate for the dispersion of a capacitor which constitutes the filter.

FIG. 5 shows an example of the programmable filter 1601, and it consists of a low-pass filter 2401, a high-pass filter 2402, an adder 2403, and another low-pass filter 2404. The filters 2401, 2402 and 2404 are controlled by the control signal 1602. Signals similar to the signals 2302 and 2303 shown in FIG. 2b are produced from an input signal similar to the signal shown in FIG. 2a and are summed by the adder 2403 to produce an equalized signal similar to the signal 2304 shown in FIG. 2c such that the. input signal is equalized.

Conventional techniques pertinent to waveform equalizers are described in U.S. Pat. No. 4,945,311, Japanese Patent Laid-open Nos. 1-80116, 1-80117, 63-122061, and 62-102481.

In the transversal circuit arranged as described above, the delay circuit has a dispersion of delay time due to the dispersion of resistance and capacitance of the circuit elements resulting from an integrated circuit fabricating process. Moreover, in the conventional circuit arrangement, a microprocessor (MPU) stores a value in the register for the frequency synthesizer in response to a certain data transfer rate and further stores a value in the register for the delay circuit, resulting in a significant overhead process for the MPU.

In the conventional programmable filter, a microprocessor (MPU) stores a value in the register for the frequency synthesizer and further stores a value in the register for the filter cutoff frequency, resulting in a significant overhead process for the MPU. The need for two independent registers and a DAC results in the whole system having a large circuit scale.

SUMMARY OF THE INVENTION

The primary object of the present invention is to provide a high-accuracy magnetic disk system in which an HDC (Hard Disk Controller) has a reduced overhead process and the circuit scale of the whole system is reduced.

The secondary object of the present invention is to provide a transversal waveform equalizer including high-accuracy delay circuits which do not depend on parameters of the fabrication process.

In order to achieve the first object, a magnetic disk system based on this invention comprises a mechanism and associated control circuit for reading and writing data on a magnetic disk, a frequency synthesizer for producing a first clock signal having a frequency which depends on a data transfer rate, a PLL (phase-locked loop) circuit for producing a control signal in correspondence to the frequency of the first clock signal, a waveform equalizing circuit for equalizing the waveform of an input original signal in accordance with the control signal thereby to produce an equalized signal, a waveform shaping circuit for producing code pulses from the equalized signal, a data separator for producing a second clock signal which is synchronous with the code pulses, a decoding circuit for decoding the code pulses based on the second clock signal, and an encoding circuit for encoding recording data based on the first clock signal.

In order to achieve the second object, a waveform equalizer based on this invention comprises a frequency synthesizer for producing a signal having a frequency which depends on the data transfer rate of an input signal, a PLL circuit for producing a control signal in correspondence to the frequency of the output signal of the frequency synthesizer, and a waveform equalizing circuit for equalizing the waveform of the input signal in accordance with the control signal, with all of these circuit components being fabricated within the same semiconductor integrated circuit device.

DESCRIPTION OF THE PREFERRED EMBODIMENTS

In a magnetic disk system based on this invention, a frequency synthesizer produces a signal having a frequency which corresponds to a value that is set depending on the data transfer rate of the magnetic disk, and the signal becomes the write clock signal. A PLL circuit monitors the output signal of the frequency synthesizer and produces a control signal in correspondence to the frequency of the signal.

In a waveform equalizer based on this invention, a frequency synthesizer produces a signal having a frequency which corresponds to a set value. A PLL circuit monitors the output signal of the frequency synthesizer and produces a control signal for variable delay circuits in correspondence to the frequency of the signal. Consequently, the dispersion of delay time caused by the dispersion of characteristics of circuit elements is absorbed by the PLL circuit which is fabricated within the same semiconductor device.

A first embodiment of the present invention will be described with reference to FIG. 6 through FIG. 19.

Figure 1:
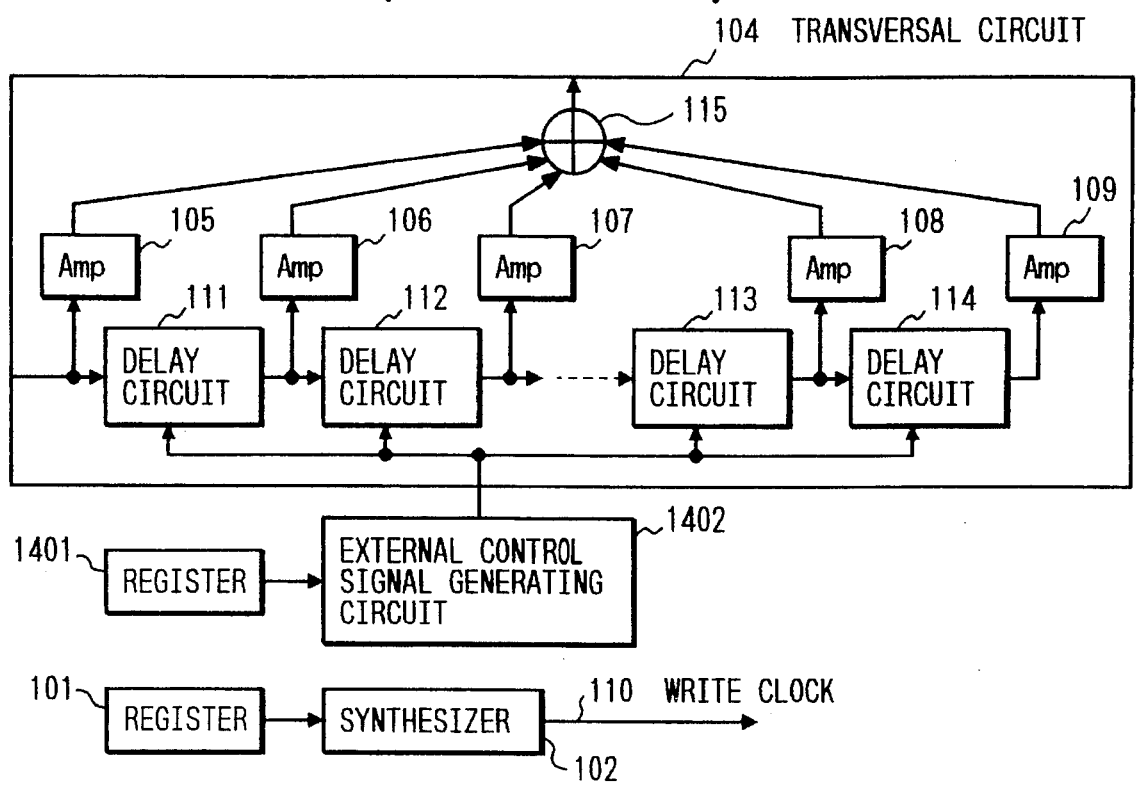
FIG. 1 is block diagram of a conventional cosine equalizing circuit which is a waveform equalizing circuit based on conventional variable delay circuits.
Figure 5:
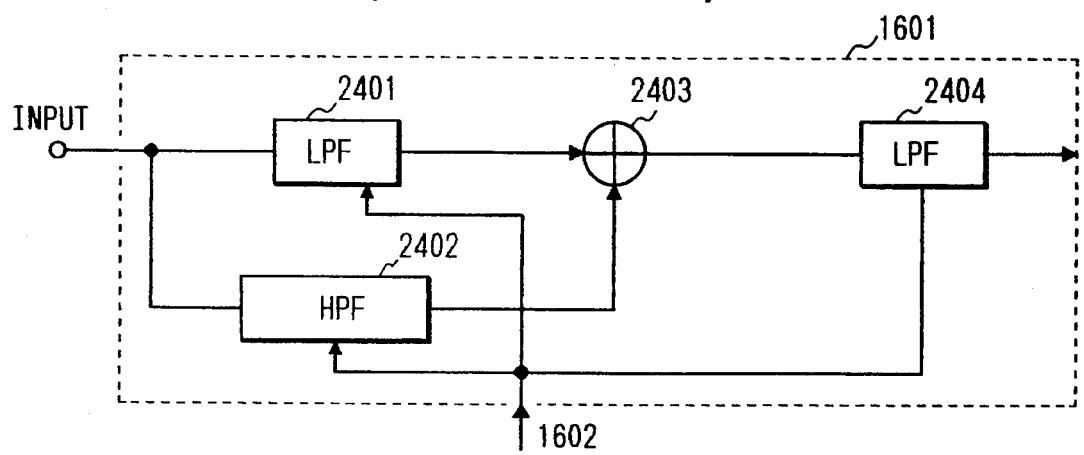
FIG. 5 is a block diagram of a conventional programmable filter.
Figure 2A:
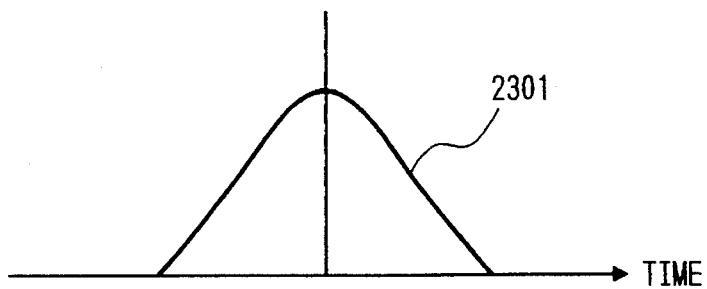
FIGS. 2a–ca are diagrams for explaining the principle of operation of the transversal in FIG. 1
Figure 2B:
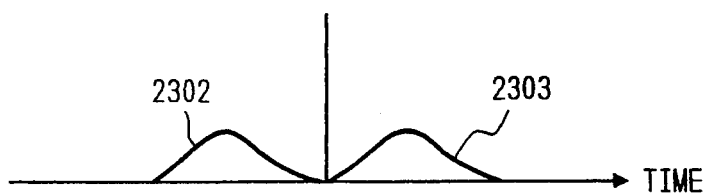
Figure 2C:
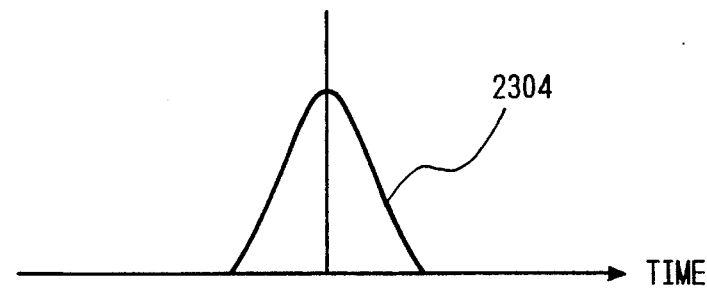
Figure 3:
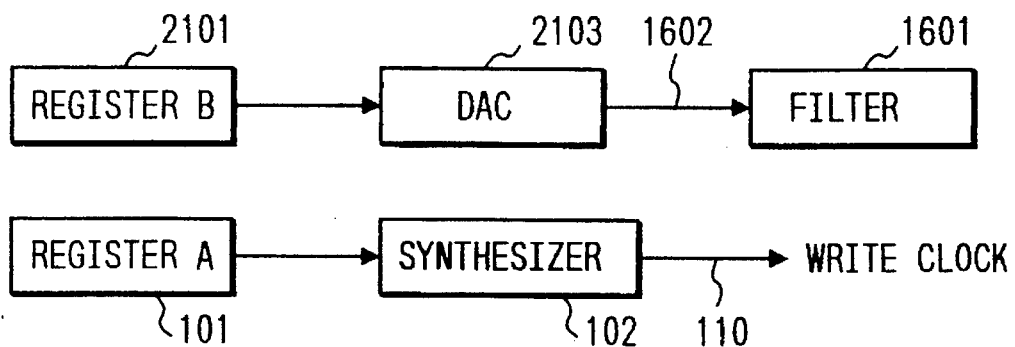
FIG. 3 is a block diagram of a conventional filter circuit.
Figure 4:
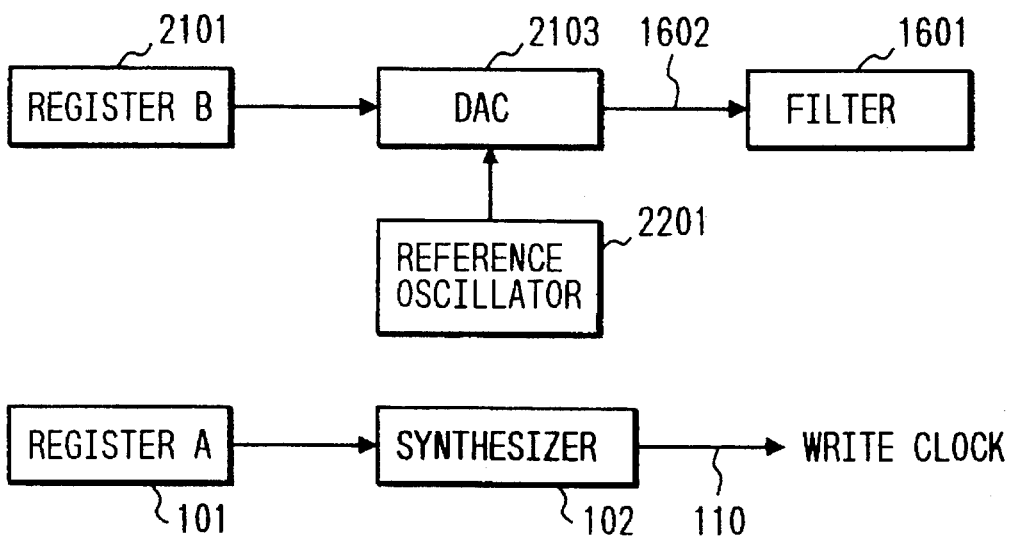
FIG. 4 is a block diagram of a conventional filter circuit which is derived from the one shown in FIG. 3 by adding a reference oscillator.
Figure 6:
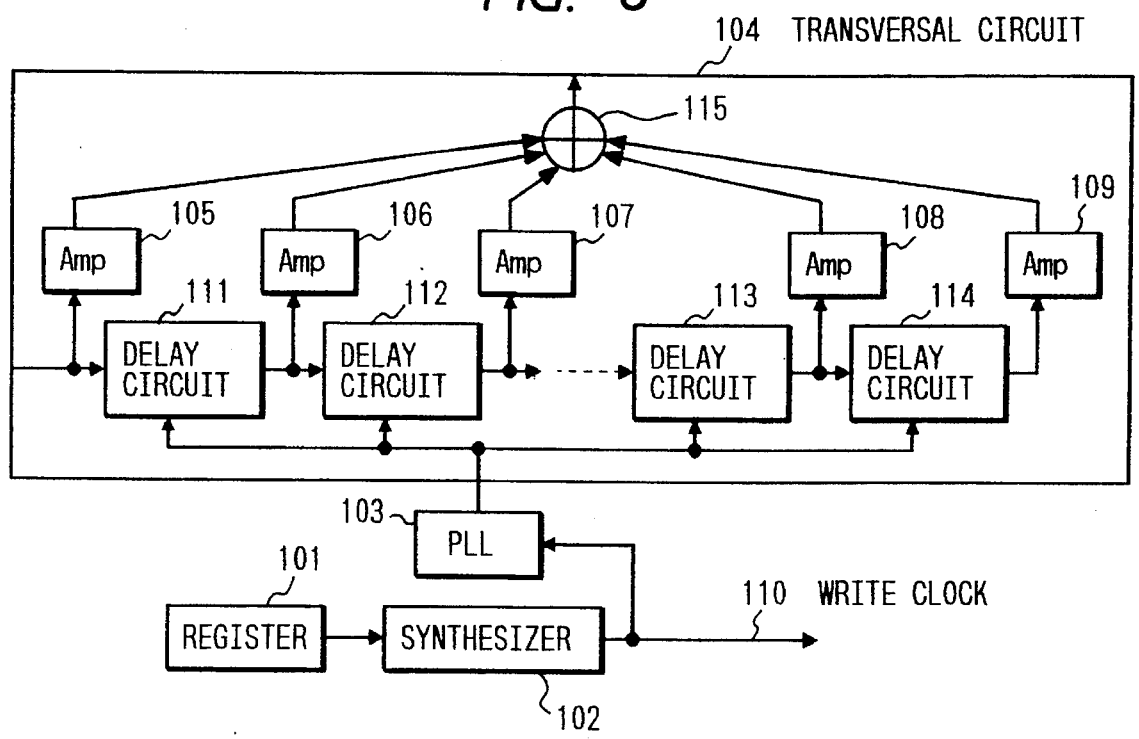
FIG. 6 is a block diagram of a waveform equalizer based on a first embodiment of this invention.

FIG. 6 shows a transversal waveform equalizer based on this invention. It consists of a register 101, a frequency synthesizer 102, a PLL circuit 103, and a transversal circuit 104. The transversal circuit 104 consists of variable delay circuits 111–114, variable gain amplifiers 105–109, and an adder 115.

The register 101 stores a value which depends on the data transfer rate of the magnetic disk, and the frequency synthesizer 102 produces a write clock signal 110 having a frequency which corresponds to the value stored in the register 101. The PLL circuit 103, which is fabricated within the same semiconductor device as the delay circuits 111–114, monitors the write clock signal 110 at the output of the frequency synthesizer 102 and produces a delay circuit control signal based on the write clock frequency. The delay circuits 111–114 have their delay time varied in response to the control signal produced by the PLL circuit 103.

Figure 7:
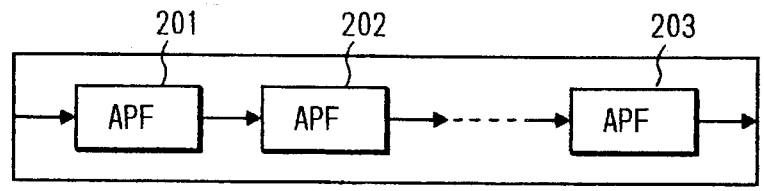
FIG. 7 is a block diagram showing the delay circuit in FIG. 6.

FIG. 7 shows the of the delay circuit. In the circuit, a plurality of APFs (All Pass Filters) 201–203 are connected in series and a flat delay characteristic based on the Bessel filter concept is implemented.

Figure 8:
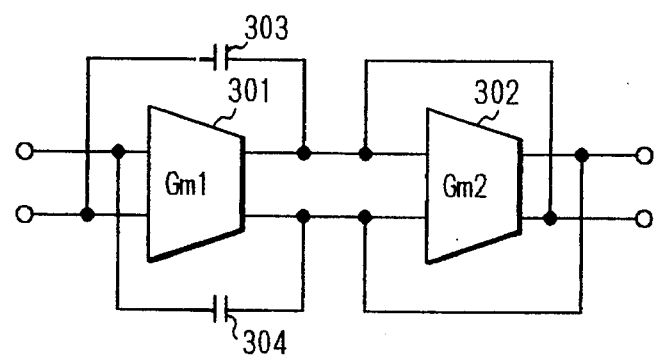
FIG. 8 is a block diagram showing an example of the APF in FIG. 7.

FIG. 8 shows a first example of the APF. It consists of variable Gm amplifiers 301 and 302 and capacities 303 and 304. The circuit has its transfer function T(S) expressed as follows.

$$T(S) = \frac{S - \frac{2Gm}{C}}{S + \frac{2Gm}{C}} \quad (1)$$

where S is a variable, C is the capacitance of the capacitors 303 and 304, and Gm is the conductance of the variable Gm amplifiers 301 and 302. The circuit has a phase lag of 90° at ω=2×Gm/C.

Figure 9:
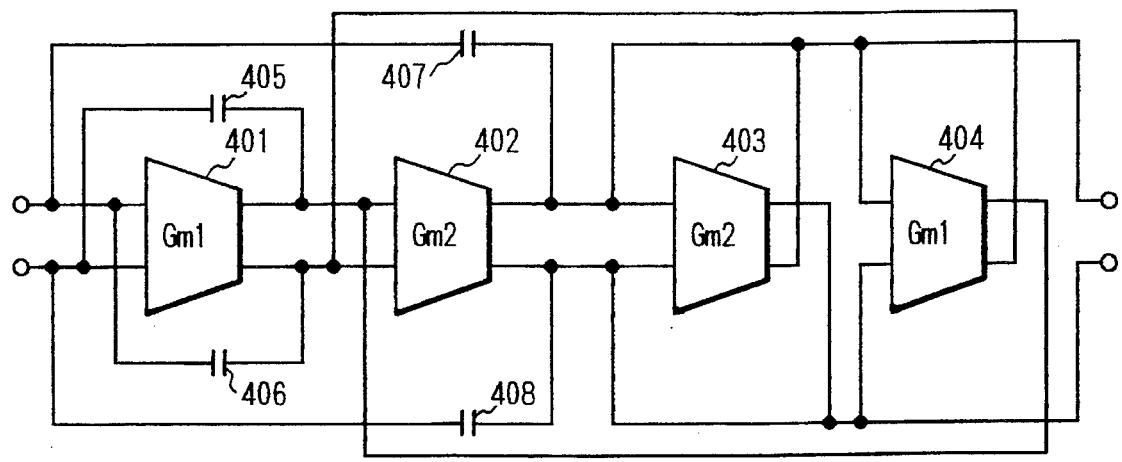
FIG. 9 is a block diagram showing another example of of the APF in FIG. 7.

FIG. 9 shows a second example of the APF, and it consists of variable Gm amplifiers 401–404 and capacitors 405–408. The circuit has a transfer function T(S) expressed as follows.

$$T(S) = \frac{S^2 - \frac{\omega t}{Q} S + \omega t^2}{S^2 + \frac{\omega t}{Q} S + \omega t^2} \quad (2)$$

where Q is the Q factor of the filter. The circuit has a phase lag of 180° at ω=ωt.

$$\omega t = 2\sqrt{\frac{Gm_1 Gm_2}{C_1 C_2}} \quad (3)$$

$$Q = 2\sqrt{\frac{C_2 Gm_1}{C_1 Gm_2}} \quad (4)$$

Figure 10:
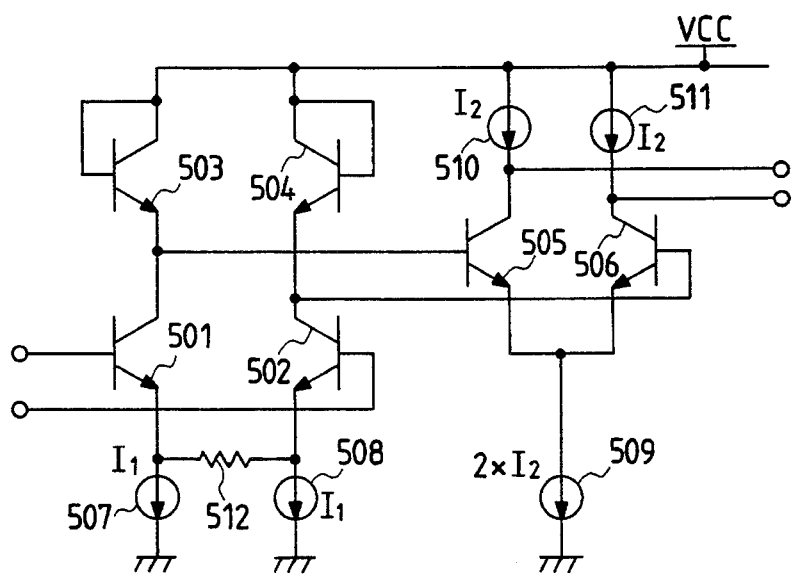
FIG. 10 is a schematic diagram of the Gm amplifier in FIG. 8 and FIG. 9.

FIG. 10 shows the circuit arrangement of the variable Gm amplifier. It consists of bipolar transistors 501–506, electric current sources 507–511, and a resistor 512. The conductance Gm of the circuit is expressed as follows.

$$Gm = \frac{1}{Re} \cdot \frac{I_2}{I_1} \quad (5)$$

where Re is the resistance of the resistor 512. By controlling the current $I_1$ of the current sources 507 and 508 or the current $I_2$ of the current source 509, the conductance Gm can be adjusted.

Figure 11:
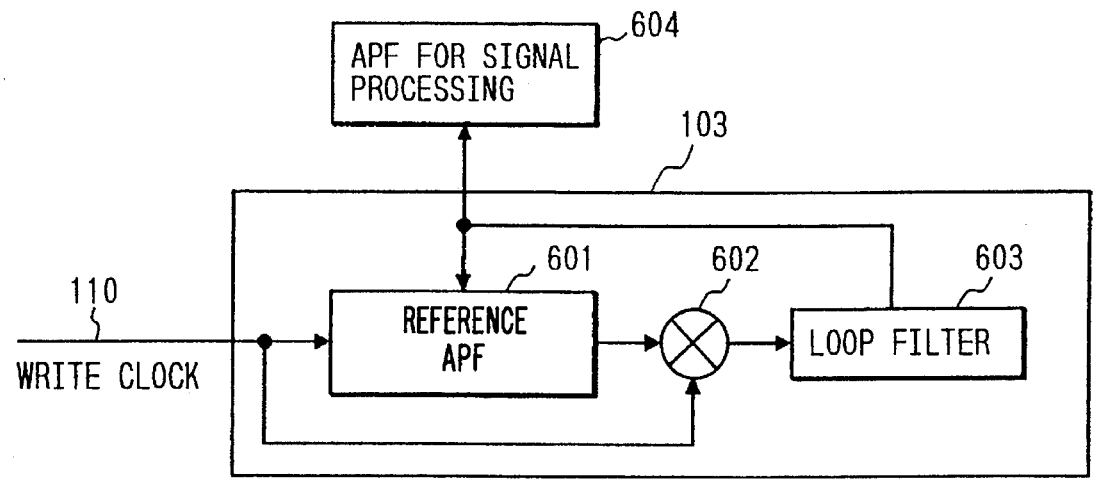
FIG. 11 is a block diagram showing an example of the PLL circuit in FIG. 6.

FIG. 11 shows the the PLL circuit 103 using the APF shown in FIG. 8. It consists of a reference APF (All Pass Filter) 601, a multiplier 602 and a loop filter 603, and is fabricated within the same semiconductor device as the APF 604 for signal processing. The reference APF 601 receives the write clock signal 110, and the multiplier 602 receives the output of the reference APF 601 and the write clock signal 110. The output of the multiplier 602 has no DC component when the write clock signal 110 and the output signal of the reference APF 601 have a phase difference of 90°.

The loop filter 603 receives the output of the multiplier 602 and extracts the DC component of the output signal of the multiplier 602 to produce a control signal. The control signal controls ω of the reference APF 601 and APF 604 for signal processing.

Based on the above-mentioned operation of the PLL circuit 103, ω is equal to 2π times the frequency of the write clock signal 110 even if circuit elements of the reference APF 601 and APF 604 have the dispersion of characteristics, and accordingly the phase characteristic of the APFs is not affected by the dispersion of characteristics of the circuit elements.

Furthermore, by controlling the APFs of the delay circuit shown in FIG. 7 by the PLL circuit shown in FIG. 11, the phase characteristic of each APF is not affected by the dispersion of characteristics of the circuit elements, and thus the delay characteristic of the delay circuit is not affected by the dispersion of characteristics of the circuit elements and is determined accurately by the frequency f of the write clock signal 110.

Figure 12:
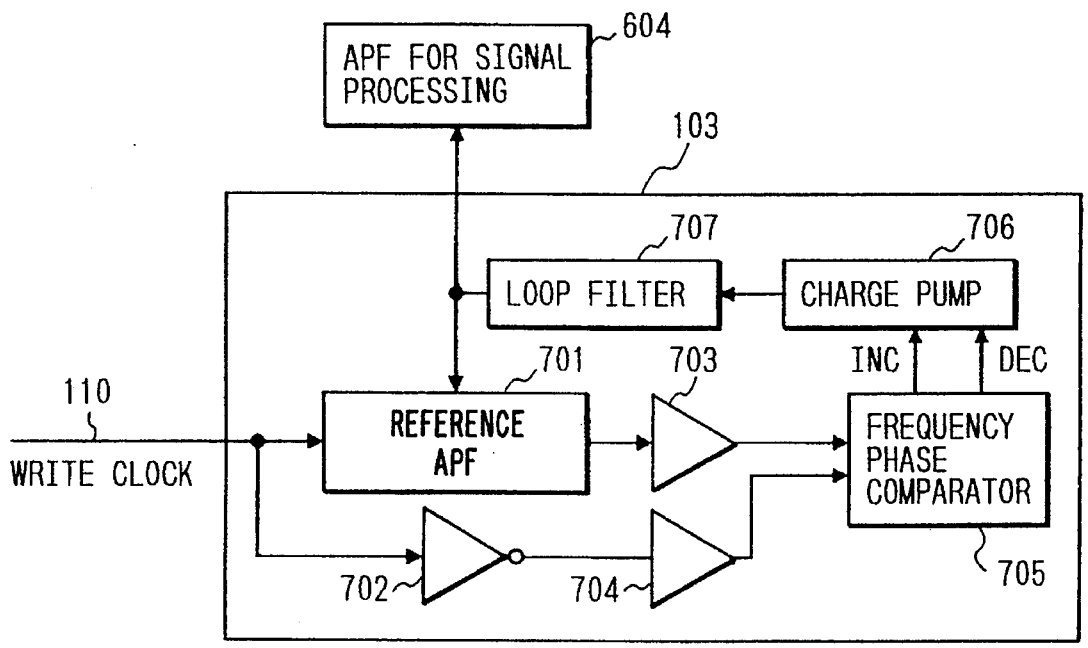
FIG. 12 is a block diagram showing another example of the PLL circuit in FIG. 6.

FIG. 12 shows another example of the PLL circuit 103 using the APF s shown in FIG. 9. The circuit consists of a reference APF 701, an inverter 702, comparators 703 and 704, a reference frequency phase comparator 705, a charge pump 706, and a loop filter 707, and is fabricated on the same semiconductor chip as the signal processing APF 604. The reference APF 701 and inverter 702 receive the write clock signal 110, and the reference frequency phase comparator 705 receives a pulse code signal produced from the output of the reference APF 701 by the comparator 703 and a pulse code signal produced from the output of the inverter 702 by the comparator 704. The output signal of the inverter 702 and the output signal of the reference APF 701 are in phase with each other when the write clock signal 110 and the output signal of the reference APF 701 have a phase difference of 180°.

The reference frequency phase comparator 705 produces an INC (increment) signal or DEC (decrement) signal indicative of a lead phase or lag phase with a time length corresponding to the phase difference of the two input signals. The charge pump 706 implements a charge operation with a constant current in response to the INC signal or a discharge operation with a constant current in response to the DEC signal for the loop filter 707 for the duration of the received signal. The loop filter 707 integrates the charging or discharging current to produce a control signal, by which ω of the reference APF 701 for reference and the APF 604 for signal processing is controlled.

Based on the above-mentioned operation of the PLL circuit 103, the reference APF 701 for reference has ω set equal to 2π times the frequency of the write clock signal 110 without being affected by the dispersion of characteristics of the APF circuit elements. Since the signal processing APF 604 and PLL circuit 103 are fabricated within the same semiconductor device, resulting in the same element disparity for the reference APF 701 and signal processing APF 604, ω of the signal processing APF 604 is not affected by the disparity of circuit elements.

Figure 13:
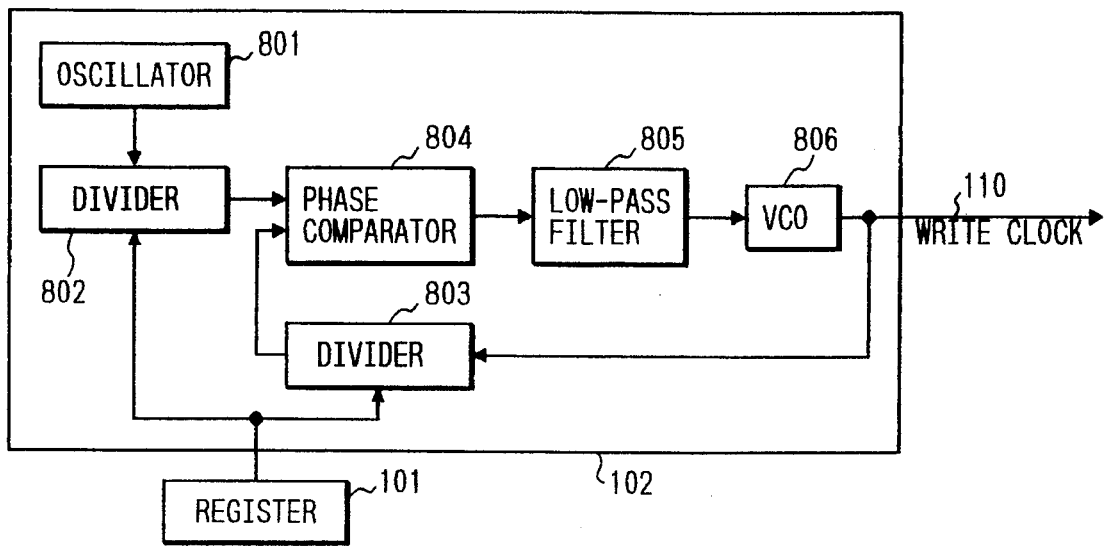
FIG. 13 is a block diagram of the frequency synthesizer in FIG. 6.

FIG. 13 shows the the frequency synthesizer 102. It consists of an oscillator 801, frequency dividers 802 and 803, a phase comparator 804, a low-pass filter 805, a VCO (Voltage Controlled Oscillator) 806, and a register 101. The frequency divider 802 divides the frequency f1 of the clock signal produced by the oscillator 801 by a factor of M which corresponds to a value stored in the register 101, thereby producing a signal with a frequency of f1/M. Another frequency divider 803 divides the frequency f0 of the output of the VCO 806 by a factor of N which corresponds to a value stored in the register 101, thereby producing a signal with a frequency of f0/N.

The phase comparator 804 compares the phases of the signal with the f1/M frequency and the signal with the f0/N frequency, and produces a signal representing the phase difference. The low-pass filter 805 receives the output signal of the phase comparator 804 and produces a control signal. The VCO 806 responds to the control signal to vary the frequency f0 of the write clock signal 110. Based on the above-mentioned operation of the frequency synthesizer 102, the signal with the f0/N frequency and the signal with the f1/M frequency are synthesized, and the write clock signal 110 having a frequency of f0=(N/M) f1 is obtained.

Figure 14:
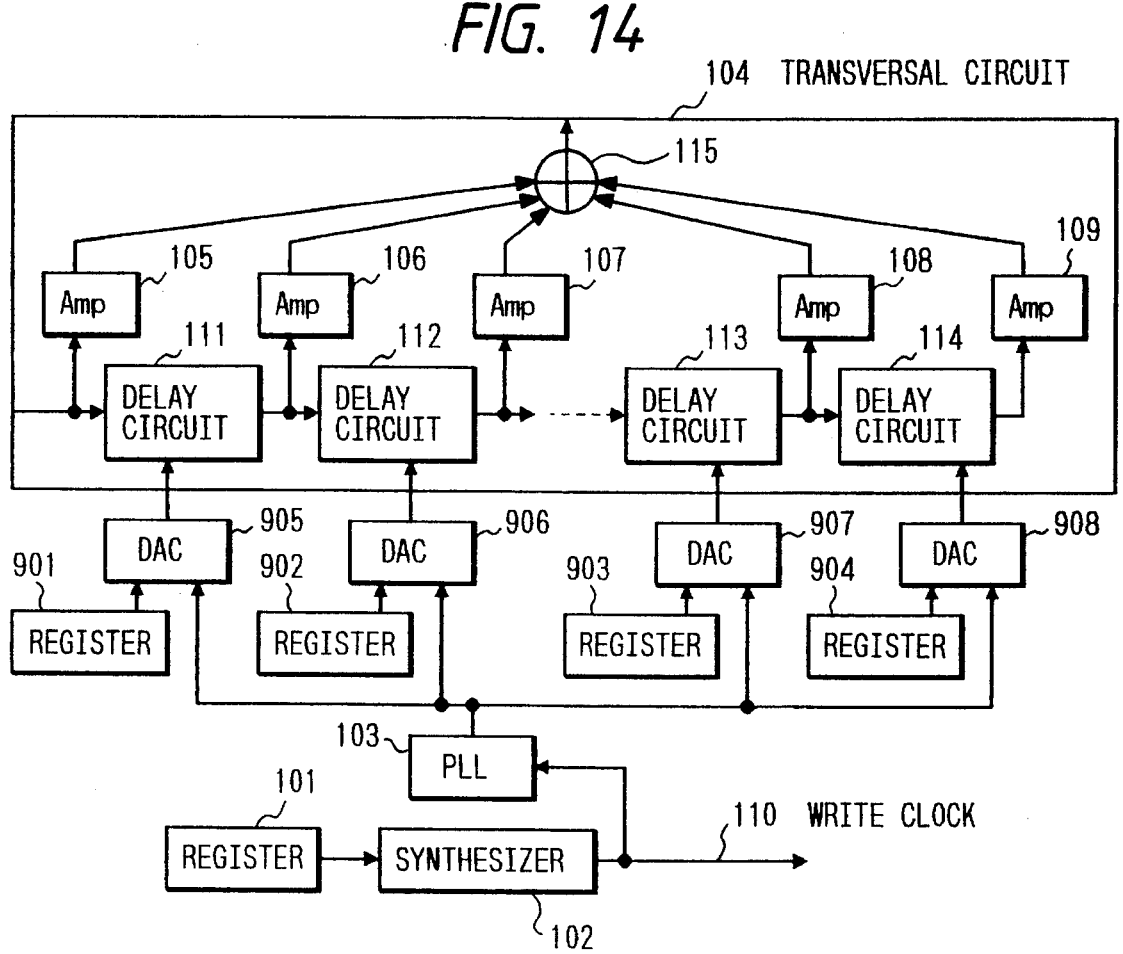
FIG. 14 is a block diagram of a system based on the first embodiment of this invention.

FIG. 14 shows another circuit which is derived from the one shown in FIG. 6 by adding registers 901–904 and DACs 905–908. This circuit is intended to set the delay times of the delay circuits 111–114 independently by controlling the control signal, produced by the PLL circuit 103 by values stored in the respective registers 901–904.

Figure 15:
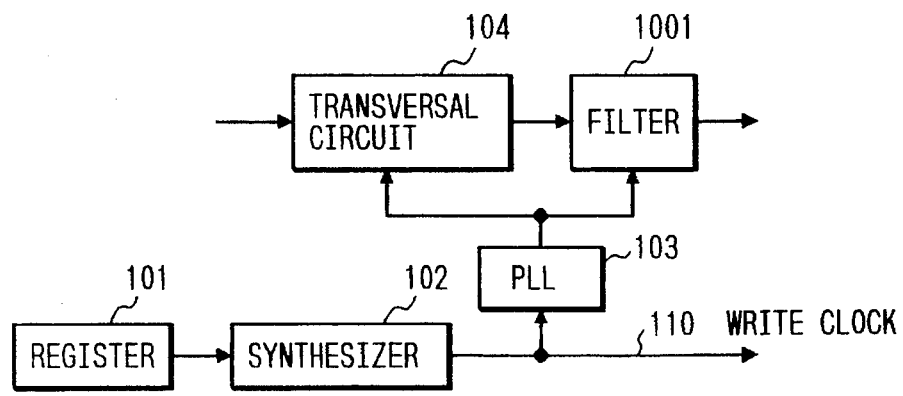
FIG. 15 is a block diagram of a system based on the the first embodiment of this invention.

FIG. 15 shows another transversal waveform equalizer which is derived from the one shown in FIG. 6 by adding a programmable filter 1001 against for harmonic noise. In a magnetic disk system, the register 101 stores a value which depends on the data transfer rate, and the frequency synthesizer 102 produces the write clock signal 110 having a frequency which corresponds to the value stored in the register 101.

The PLL circuit 103 monitors the write clock signal 110 and produces a control signal by which the delay characteristic of the transversal circuit 104 and the cutoff frequency of the filter 1001 are controlled. The filter 1001 is fabricated within the same semiconductor device as the PLL circuit 103 and transversal circuit 104, and consequently the filter 1001 has its cutoff frequency determined accurately by the frequency of the write clock signal 110 without being affected by the dispersion of characteristics of the circuit elements of the filter 1001.

Figure 16:
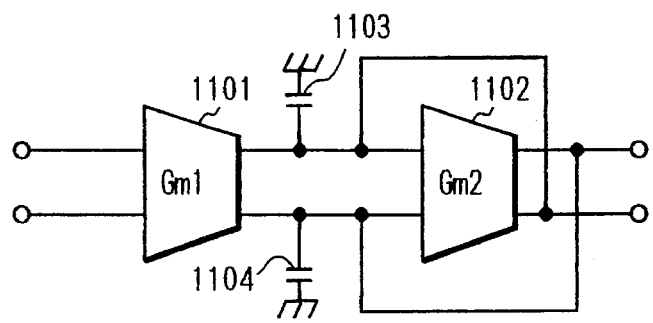
FIG. 16 is a block diagram of an example of the filter in FIG. 15.

FIG. 16 shows a first example of a programmable LPF which may be used for filter 1001 in FIG. 15. It consists of variable Gm amplifiers 1101 and 1102 and capacitors 1103 and 1104, and has a cutoff frequency expressed as follows.

$$fc = \frac{Gm}{\pi C} \quad (6)$$

where Gm is the conductance of the variable Gm amplifier.

Figure 17:
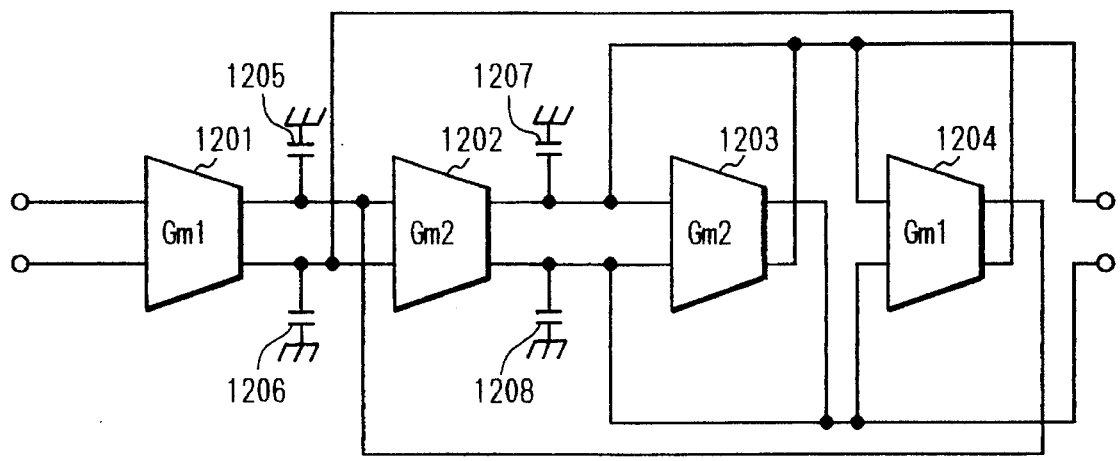
FIG. 17 is a block diagram of another example of the filter in FIG. 15.

FIG. 17 shows a second example of a programmable LPF which may be used for filter 1001 in FIG. 15. It consists of variable Gm amplifiers 1201–1204 and capacitors 1205–1208, and has a cutoff frequency expressed as follows.

$$fc = \frac{1}{\pi} \sqrt{\frac{Gm_1 Gm_2}{C_1 C_2}} \quad (7)$$

Figure 18:
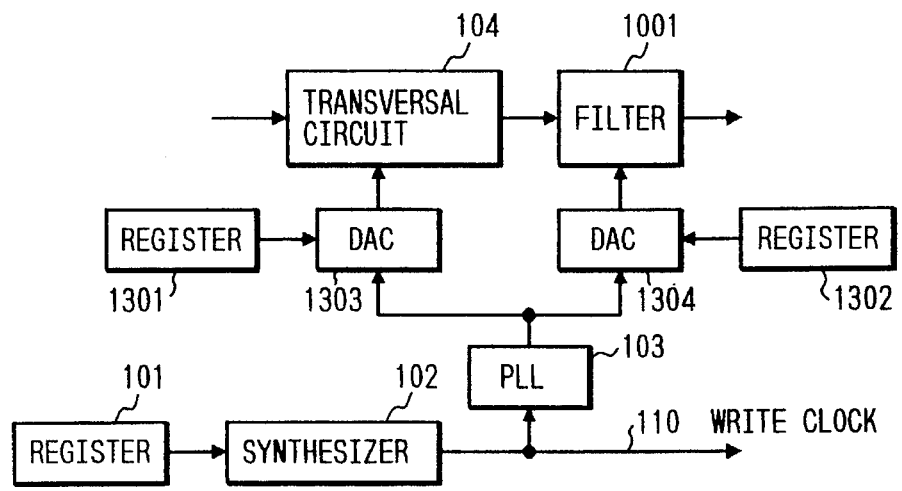
FIG. 18 is a block diagram of a system based on the first embodiment of this invention.

FIG. 18 shows another transversal waveform equalizer which is derived from the one shown in FIG. 15 by adding registers 1301 and 1302 and DACs 1303 and 1304. It the delay time of transversal circuit 104 and the cutoff frequency of filter 1001 to be controlled independently.

Figure 19:
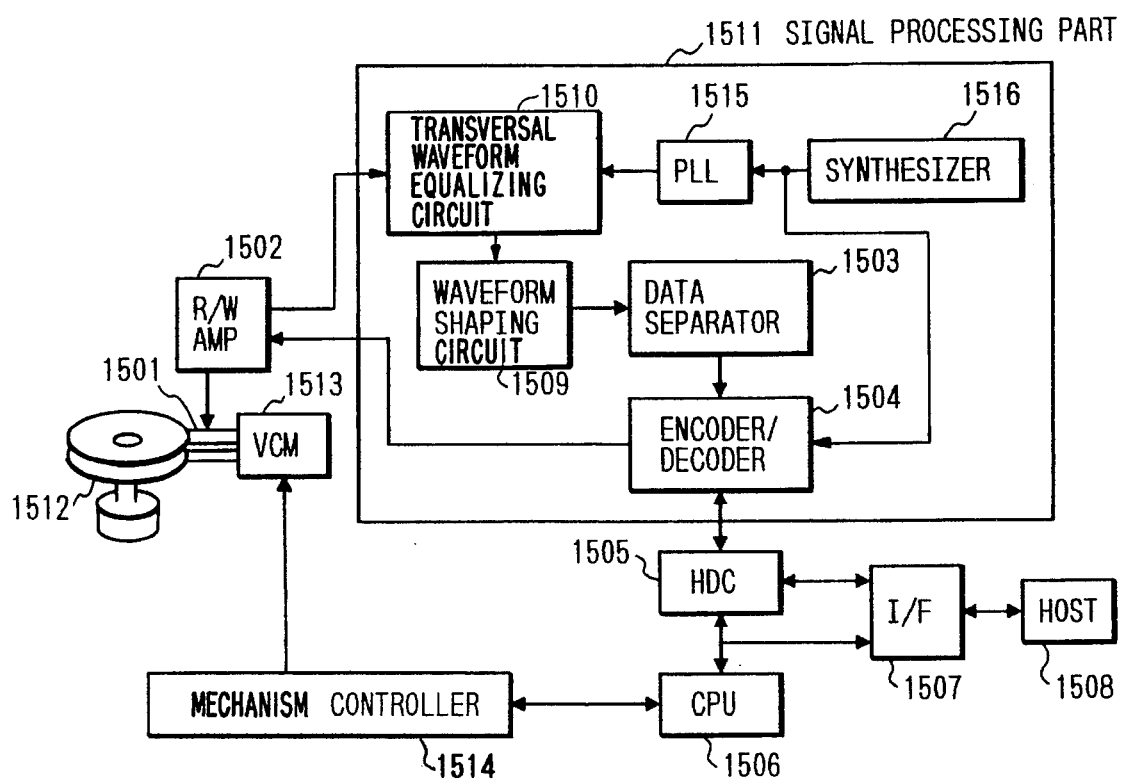
FIG. 19 is a block diagram of a magnetic disk system based on the first embodiment of this invention.

FIG. 19 shows a the magnetic disk system using a transversal waveform equalizing circuit 1510 based on this invention. The system consists of a magnetic disk 1512, a magnetic head 1501, a read/write signal amplifier 1502, a signal processor 1511, a VCM (Voice Coil Motor) 1513, a mechanism controller 1514, an HDC (Hard Disk Controller) 1505, a CPU 1506 for controlling an interface circuit 1507, a host data processor 1508, and the PLL circuit 1515 and frequency synthesizer 1516 explained previously. The signal processor 1511 consists of a waveform shaping circuit 1509 which produces code pulses from the readout signal, transversal waveform equalizing circuit 1510, a data separator 1503 which produces a clock signal which is synchronous with the code pulses, and an encoder/decoder 1504 for the recording signal.

Next, a second embodiment of the present invention will be explained with reference to FIG. 20 through FIG. 24.

Figure 20:
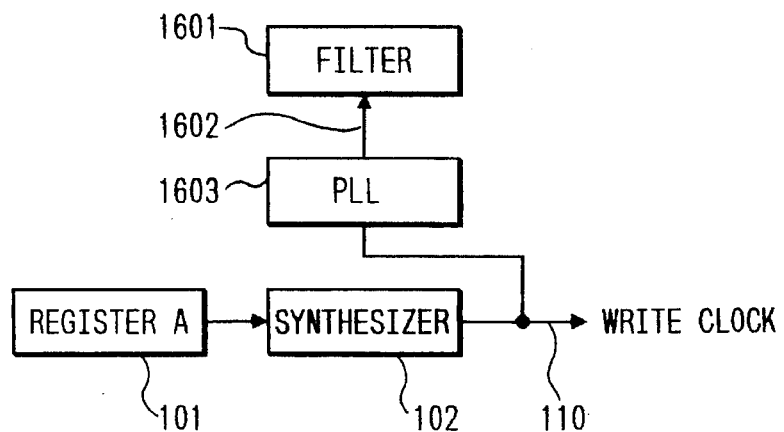
FIG. 20 is a block diagram of a system based on a second embodiment of this invention.

FIG. 20 shows in brief the arrangement of the CDR-compatible programmable filter system based on the second embodiment of this invention. It consists of a register A 101, a programmable filter 1601, a frequency synthesizer 102, and a PLL circuit 1603.

The register A 101 stores a value which depends on the data transfer rate of the magnetic disk, and the frequency synthesizer 102 receives the value stored in the register A 101 and produces a write clock signal 110 having a frequency of f0. The PLL circuit 1603 receives the write clock signal 110 and produces a control signal 1602 which controls the cutoff frequency of the filter 1601. The frequency synthesizer 102 has the same arrangement as shown in FIG. 13.

Figure 21:
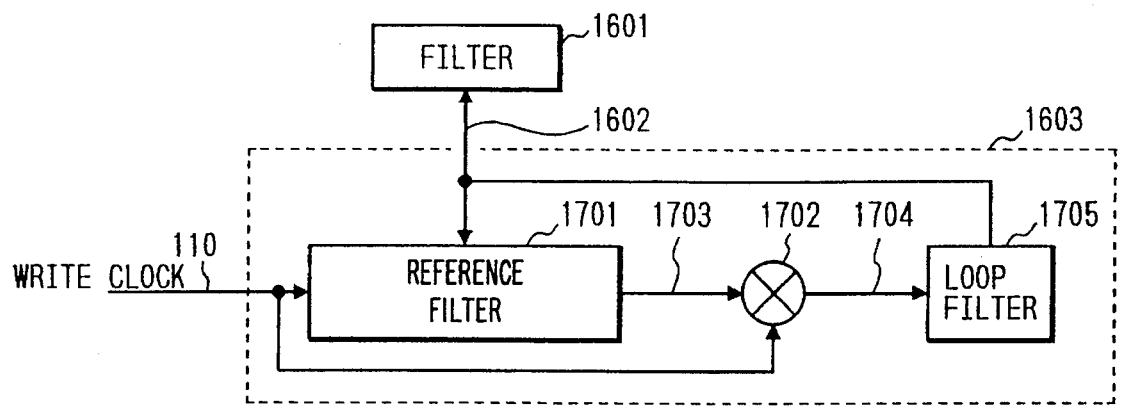
FIG. 21 is a block diagram of an example of the PLL circuit in FIG. 20.

FIG. 21 shows an example of the PLL circuit 1603 in FIG. 20. It consists of a reference filter 1701, a multiplier 1702 and a loop filter 1705. The reference filter 1701 is a programmable filter with a variable cutoff frequency as in the case of the signal processing filter 1601.

The reference filter 1701 for reference receives the write clock signal 110 and produces a signal 1703 which is out of phase by θ with respect to the signal 110. The multiplier 1702 multiplies the signal 110 by the signal 1703 to produce a signal 1704. The signal 1704 has no DC component only when the signals 1703 and 110 have a phase difference of 90°, and otherwise it includes a DC component.

The loop filter 1705 extracts the DC component from the signal 1704 to produce a control signal 1602. The cutoff frequency of the reference filter 1701 varies in accordance with the control signal 1602. Based on the above-mentioned operation of the PLL circuit 1603, cutoff frequency of the reference filter 1701 is made equal to the frequency f0 of the write clock signal 110. The PLL circuit 1603 outputs the control signal 1602, by which the cutoff frequency of the signal processing filter 1601 is controlled.

Figure 22:
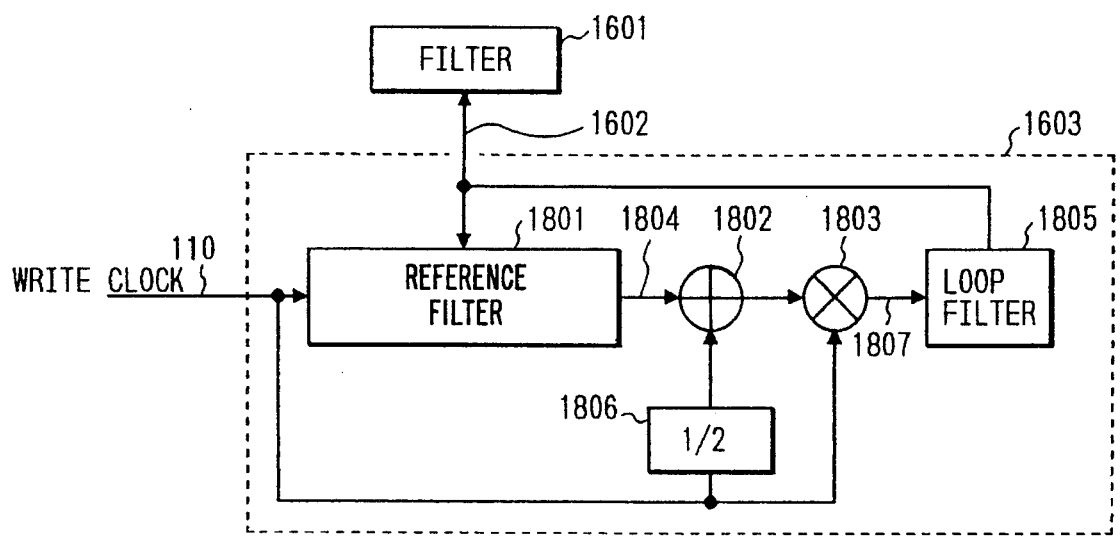
FIG. 22 is a block diagram showing another example of the PLL circuit in FIG. 20.

FIG. 22 shows another example of the PLL circuit 1603 in FIG. 20. The circuit consists of a multiplier 1803, a loop filter 1805, a reference filter 1801, an attenuator 1806, and an adder 1802. The reference filter 1801 is a programmable filter with a variable cutoff frequency as in the case of the signal processing filter 1601.

The reference filter 1801 receives the write clock signal 110 and produces a signal 1804 having a phase lag of θ with respect to the signal 110. The attenuator 1806 receives the write clock signal 110 and attenuates the signal by one-half. The adder 1802 sums the signal 1804 and the output of the attenuator 1806. The multiplier 1803 multiplies the output Of the adder 1802 by the write clock signal 110 to produce a signal 1807. The signal 1807 has no DC component only when the signals 1804 and 110 have a phase difference of 45°, and otherwise it includes a DC component.

The loop filter 1805 extracts the DC component of the signal 1807 to produce a control signal 1602. The cutoff frequency of reference filter 1801 varies in accordance with the control signal 1602. Based on the above-mentioned operation of the PLL circuit, the cutoff frequency of reference filter 1801 is made equal to the frequency f0 of the write clock signal 110. The PLL circuit 1603 outputs the control signal 1602 by which the cutoff frequency of the signal processing filter 1601 is controlled.

Figure 23:
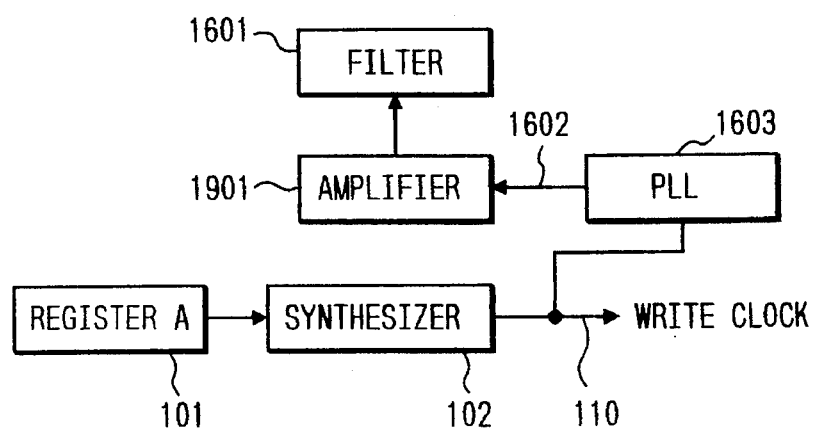
FIG. 23 is a block diagram of a system based on the second embodiment of this and FIG. 24 is a block diagram of a system based on the second embodiment of this invention.

FIG. 23 shows a filter system which is derived from the one shown in FIG. 20 and adding by an amplifier 1901. The amplifier 1901 having a gain of K times the control signal 1602 produced by the PLL circuit 1603 and the cutoff frequency of the signal processing filter 1601 are controlled by the amplified signal. By producing a K-times control signal with the amplifier 1901, it is possible to set the cutoff frequency of the signal processing filter to 1601 to K times the output frequency of the frequency synthesizer 102.

Figure 24:
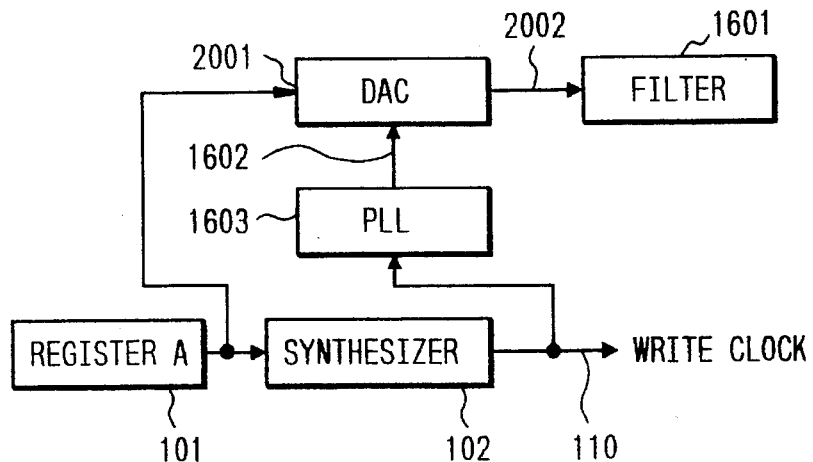

FIG. 24 shows a filter system which is derived from the one shown in FIG. 20 by adding a DAC 2001. The DAC 2001 monitors the control signal 1602 produced by the PLL circuit 1603, and produces a control signal 2002 in correspondence to the value stored in the register A 101. The control signal 2002 controls the cutoff frequency of the signal processing filter 1601. Since the DAC 2001 multiplies the control signal 1602 by a magnification factor stored in the register A 101, the signal processing filter 1601 has its cutoff frequency made equal to the output frequency of the frequency synthesizer 102 multiplied by a magnification factor which depends on the data transfer rate.

By using the inventive programmable filter in place of the transversal waveform equalizing circuit 1510 shown in FIG. 19, a magnetic disk system can be provided.

According to the present invention which is intended for a CDR-compatible magnetic disk system, the write clock frequency and the delay time of the transversal circuit can be set arbitrarily by merely changing a value stored in a register in response to a variation of the data transfer rate.

The delay circuit is controlled by the PLL circuit which is fabricated within the same semiconductor device as of the transversal circuit, and consequently the disparity of delay time due to the disparity of circuit elements can be minimized.

The present invention is capable of reducing the circuit scale of the CDR-compatible waveform equalizer.

What is claimed is

1. A magnetic disk system comprising: a mechanism and associated control circuit for reading and writing data on a magnetic disk; a frequency synthesizer for producing a first clock signal having a frequency which depends on the transfer rate of said data; a phase-locked loop (PLL) circuit for producing a control signal in correspondence to the frequency of said first clock signal; a waveform equalizing circuit for equalizing the waveform of an original signal in accordance with said control signal thereby to produce an equalized signal; a waveform shaping circuit for producing code pulses from said equalized signal; a data separator for producing a second clock signal which is synchronous with said code pulses; a decoding circuit for decoding said code pulses based on said second clock signal; and an encoding circuit for encoding record data based on said first clock signal.

2. A magnetic disk system according to claim 1, wherein said waveform equalizing circuit comprises a plurality of variable delay circuits having a delay time set arbitrarily by said control signal, and an adder for summing the outputs of said variable delay circuits.

3. A magnetic disk system according to claim 2 further including registers and D/A converters for setting delay times independently for said variable delay circuits.

4. A magnetic disk system according to claim 1, wherein said waveform equalizing circuit includes a programmable filter having a cutoff frequency controlled by said first clock signal.

5. A magnetic disk system according to claim 4 further including a D/A converter for producing, in accordance with said control signal and a set value, a second control signal for controlling the delay time of said waveform equalizing circuit and the cutoff frequency of said programmable filter independently.

6. A magnetic disk system according to claim 1, wherein said waveform equalizing circuit comprises a programmable filter having a cutoff frequency set arbitrarily by said control signal.

7. A magnetic disk system according to claim 6 further including an amplifier for setting the cutoff frequency of said programmable filter K times the frequency of said first clock signal.

8. A magnetic disk system according to claim 6 further including a D/A converter for setting the cutoff frequency of said programmable filter equal to the frequency of said first clock signal multiplied by a magnification factor which depends on the data transfer rate.

9. A magnetic disk system according to claim 1, wherein at least said frequency synthesizer, said PLL circuit and said waveform equalizing circuit are fabricated within a same semiconductor integrated circuit device.

10. A waveform equalizer for a magnetic disk system comprising a frequency synthesizer for producing a signal having a frequency which depends on the transfer rate of an original signal; a phase-locked loop (PLL) circuit for producing a control signal in correspondence to the frequency of the output signal of said frequency synthesizer; a plurality of variable delay circuits for delaying said original signal by an arbitrary delay time in accordance with said control signal, and an adder for summing the outputs of said variable delay circuits, all of said component circuits being fabricated within a same semiconductor integrated circuit device.

11. A waveform equalizer for a magnetic disk system according to claim 10 further including registers and D/A converters in correspondence to said variable delay circuits for setting delay times of said delay circuits independently.

12. A waveform equalizer for a magnetic disk system according to claim 11 further including a programmable filter having a cutoff frequency controlled by the output signal of said frequency synthesizer.

13. A waveform equalizer for a magnetic disk system according to claim 12 further including a D/A converter for producing, in accordance with said control signal and a set value, a second control signal for controlling the delay times of said delay circuits and the cutoff frequency of said programmable filter independently.

* * * * *